June 9, 1942.    E. H. PIRON    2,286,103
RAIL VEHICLE WHEEL
Filed Dec. 13, 1939

INVENTOR.
Emil H. Piron
BY
ATTORNEY.

Patented June 9, 1942

2,286,103

UNITED STATES PATENT OFFICE 2,286,103

RAIL VEHICLE WHEEL

Emil H. Piron, New York, N. Y., assignor to Transit Research Corporation, a corporation of New York Application December 13, 1939, Serial No. 309,055

14 Claims. (Cl. 295—11)

This invention relates to resilient wheels particularly adapted for rail vehicle use and has for its primary object to provide a resilient wheel of generally improved construction and having a tire which can be employed for braking.

Rail vehicle wheels of a known, successfully operated type, are composed of two main radial plates, attached to the hub, and a tire or tread having an inwardly radiating plate or web extending between and separated from the two main plates by elastic shear elements. An example of such a wheel is disclosed in my prior Patent No. 2,138,506, to which attention is invited. In such constructions the main plates are stiffened by conical or pyramidal bracing plates. Because of space limitations the thickness of the elastic elements is limited, and this limitation acts, therefore, to limit the degree of resiliency obtainable in the wheel inasmuch as increasing the thickness increases the resiliency. This invention has as an object to provide a wheel construction in which the thickness of the shear springing elements may be increased to any reasonable amount without trespassing upon prohibited space and which will, at the same time, allow for centering of the tire itself with respect to the tire carrying plate or flange.

Another object is to provide a wheel in which the tire carrying plate is sprung from the hub by rubber elements acting in shear, to so space the tire carrying plate from rubber elements as to incorporate a substantial air gap and, further, to so arrange the tire carrying plate that adequate air in motion may make contact therewith to effectively cool it. Tread braking may, therefore, be accomplished without danger of damaging the springing elements by reason of frictional heat.

Another object is to provide a wheel construction embodying a tire having an inwardly radiating supporting web or plate which is attached in axially spaced relation with respect to shear springs carried by the hub of the wheel. In addition to the advantages above pointed out, this construction permits removal of the tire without necessarily dismantling any of the shear springs or the means connecting the shear springs to the hub.

Other objects and advantages will become more fully apparent as reference is had to the accompanying drawing wherein my invention is illustrated, and in which.

Figure 2:
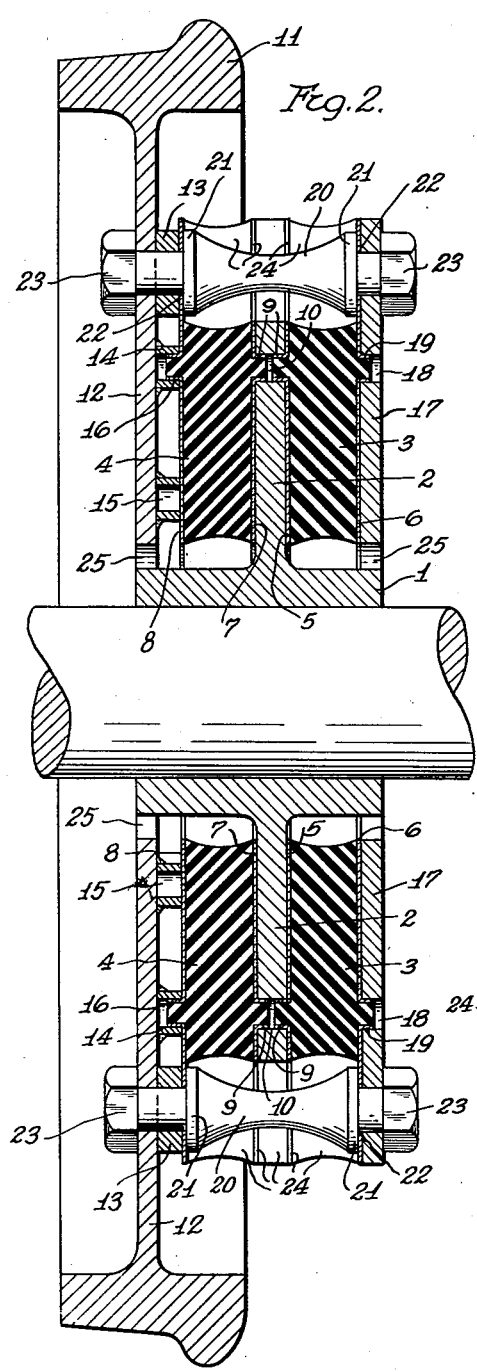
Fig. 2 is a section taken on the line 2—2 of Fig. 1.
Figure 1:
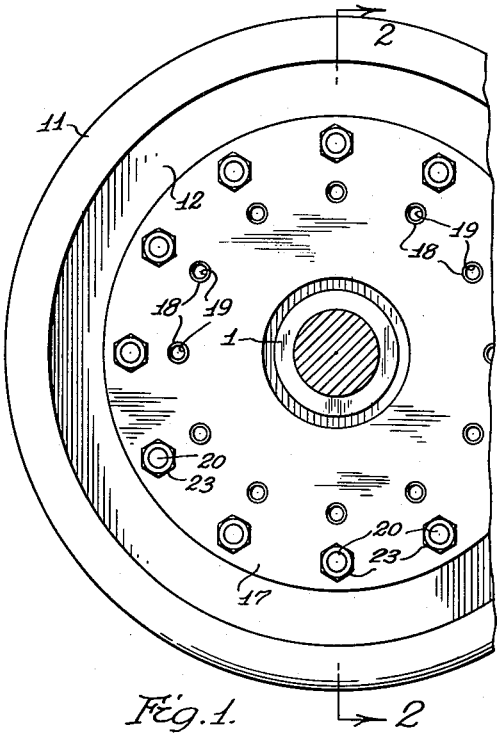
Fig. 1 is a fragmental side elevation of the wheel.
Figure 3:
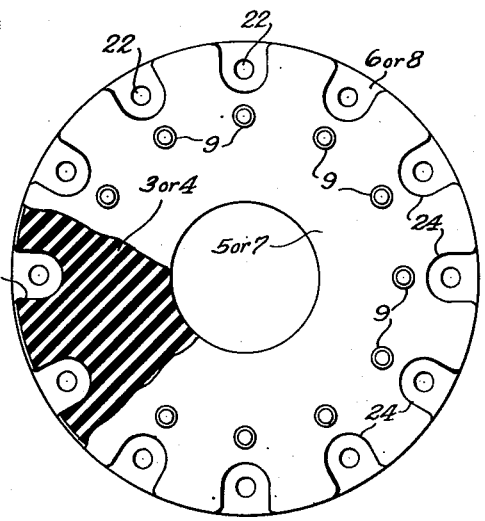
Fig. 3 is an elevation of one of the shear spring elements, with part thereof broken away and in cross section.

More particularly, I designates a hub which may be of any conventional or special design, according to the type of axle upon which it is to be mounted. The hub is preferably of comparatively thick cross section and integral therewith and radiating outwardly therefrom is a comparatively heavy main plate 2. The hub and its radiating plate are formed heavy in order to incorporate a high degree of rigidity inasmuch as the single radiating plate comprises the sole means for attaching the wheel structure to the hub as is described hereinafter.

A pair of springs or springing elements 3 and 4 are provided. Each spring is composed of a disc-like body of rubber or a similar elastic plastic material, designed to act in shear to provide the desired degree of resiliency. The spring 3 has sheet metal discs 5 and 6 surface bonded respectively to opposite sides thereof, and the spring 4 has similar sheet metal discs 7 and 8 surface bonded to opposite sides thereof. The springs 3 and 4 are disposed on opposite sides of the hub plate 2 with their sheet metal discs 5 and 7 contacting opposite sides thereof. To hold the discs 5 and 7 against movement relative to the hub plate 2 dowels 9 are provided on the discs to engage the walls of apertures 10 in the hub plate.

The tire or rim member 11 is formed with an inwardly radiating web or plate 12 which is spaced from the disc 8 of the spring 4 by sets 13, 14 and 15 of spacers. The spacers 13 are in the form of washers, loose with respect to the web 12 and disc 8. The spacers 14 and 15 comprise short tubes, secured as by welding to the web 12. The tubular formation permits use of the spacers for the reception of dowels on the disc 8. As an example, dowels 16 are formed on the disc 8 and engage in the tubular spacers 14. It will be understood, of course, that similar dowels could, if desired, be used in conjunction with the spacers 15.

A stiff plate 17, having apertures 18 receiving dowels on the sheet metal disc 6, is secured to the tire web 12 by a plurality of bolts 20. The bolts 20 have shoulders 21 engaging the inner surfaces of the sheet metal discs 6 and 8, and the nuts 23 are tightened to clamp the plate 17 and disc 6 against one shoulder and the web 12 and disc 8 against the other shoulder. The discs 5 and 8 both have apertures 22 through which the bolts 20 extend, and the other discs 5 and 7, as well as the hub plate 2 and springs 3 and 4 are recessed at 24 to provide clearance adjacent the several bolts.

It will be noted that according to the structure above defined the springing means is disposed entirely on the inner side of the wheel, and that it acts substantially entirely in shear. Due to its relation, there is no necessity for a confining hub structure, although a dust shield may, of course, be provided. However, the disposition and construction of the springing means is such that the elastic masses may be formed considerably wider or thicker than in the type of wheel referred to in the preamble. The comparatively wider or thicker elastic elements result in greater resiliency, or in a wheel of the "super-resilient" type.

It will also be apparent that spacing the web 12 from the disc 8 provides an air space between the web and the springs, and that air may enter the axial opening 25 in the web and circulate between the web and springs. Thus, any heat generated in the rim or tire during braking may be dissipated into the surrounding atmosphere without subjecting the springs to damaging temperatures.

Another advantage of the construction above described is that the tire may be readily removed and replaced. If, for any reason, removal of the tire or rim is found necessary, it may be removed simply by removing the nuts 23 which hold it in place. The spring structure need not be disturbed during this operation, and due to the presence of the dowel receiving means on the web, a substituted tire or rim may be placed in accurate alignment with the remainder of the structure without relying on the bolts as the aligning means.

What is claimed is:

1. In a wheel, a hub having a rigid plate radiating therefrom, a pair of rigid plates rigidly connected in axially spaced relation with one on each side of the hub plate, springs comprising elastic shear elements interposed between said hub plate and each pair of plates, a rail engaging tire fixedly secured to one of said pair of plates for movement therewith, and an air passageway between said springs and the plate which carries said tire.

2. In a wheel, a hub having a rigid plate radiating therefrom, a pair of rigid plates rigidly connected in axially spaced relation with one on each side of the hub plate, springs comprising elastic shear elements interposed between said hub plate and each of said pair of plates, a rail engaging tire fixedly secured to one of said pair of plates for movement therewith, and spacer means separating said springs from the plate carrying the tire.

3. In a wheel, a hub having a rigid plate radiating therefrom, a pair of rigid plates disposed with one on each side of the hub plate, means rigidly spacing said pair of plates apart, springs comprising elastic shear elements having metallic discs surface bonded to each side thereof interposed between the hub plate and each of said pair of plates, a rail engaging tire carried by one of said pair of plates, and means spacing the last named plate from the metallic disc of the adjacent spring.

4. In a wheel, a hub having a rigid plate radiating therefrom, a pair of rigid plates disposed with one on each side of the hub plate, means rigidly spacing said pair of plates apart, springs comprising elastic shear elements having metallic discs surface bonded to each side thereof interposed between the hub plate and each of said pair of plates, a rail engaging tire carried by one of said pair of plates, and an air passageway between the plate which carries the rim and the adjacent spring disc.

5. In a wheel, a hub having a rigid plate radiating therefrom a pair of rigid plates disposed with one on each side of the hub plate, means rigidly spacing said pair of plates apart, springs comprising elastic shear elements having metallic discs surface bonded to each side thereof interposed between the hub plate and each of said pair of plates, a rail engaging tire carried by one of said pair of plates, dowel receiving means on said plates, and dowels on said discs engaging the receiving means of adjacent plates, the dowel receiving means of at least the tire carrying plate being in the form of spacers for preventing contact between the plate and the adjacent metallic disc.

6. In a wheel, a hub having a rigid plate radiating therefrom a pair of rigid plates disposed with one on each side of the hub plate, means rigidly spacing said pair of plates apart, springs comprising elastic shear elements having metallic discs surface bonded to each side thereof interposed between the hub plate and each of said pair of plates, a rail engaging tire carried by one of said pair of plates, dowels on said discs engaging the adjacent plates, and dowel receiving means on the tire carrying plate engaging the adjacent disc and rigidly spacing it from the tire carrying plate.

7. In a wheel, a hub having a rigid plate radiating therefrom, a pair of rigid plates disposed with one on each side of the hub plate, means rigidly spacing said pair of plates apart, springs comprising elastic shear elements having metallic discs surface bonded to each side thereof interposed between the hub plate and each of said pair of plates, a rail engaging tire carried by one of said pair of plates, and the metal disc adjacent the tire carrying plate and also said tire carrying plate having interfitting dowel means shouldered to constitute also spacer means for separating said disc from surface contact with said tire carrying plate.

8. A resilient wheel comprising a hub having a rigid plate radiating therefrom, a pair of rigid plates, elastic shear elements separating the hub plate from each of said pair of plates, a tire carried by one of said pair of plates, spacer means separating said pair of plates, and means rigidifying said spacer means with respect to each of said pair of plates, said rigidifying means including means for rigidly spacing the tire carrying plate from the adjacent spring.

9. A resilient wheel comprising a hub having a rigid plate radiating therefrom, a pair of rigid plates, elastic shear elements separating the hub plate from each of said pair of plates, a tire carried by one of said pair of plates, and a plurality of bolts connecting said pair of plates, said bolts having shoulders for engagement with the opposed surfaces of said pair of plates, washers for spacing the tire carrying plate from the adjacent elastic shear element, and nuts threaded thereon rigidifying said plates with respect to the shoulders.

10. In a resilient wheel, a metallic rail engaging tire, a hub, yieldable means for supporting said tire on said hub for relative radial movement with respect thereto, said tire having an inwardly radiating web portion, means spacing said web from the yieldable means to provide an air space, and removable means for attaching said web to said yieldable means.

11. In a resilient wheel, a hub having a rigid spring support radiating therefrom, a shear spring on each side of said support retained against sliding movement with respect thereto, a plate on the outside of one of said springs and retained against movement with respect thereto, a tire having an inwardly radiating web adjacent the outside of the last named spring and retained against movement with respect thereto, and means rigidly connecting said plate and web in spaced relation.

12. In a resilient wheel, a hub having a rigid spring support radiating therefrom, a shear spring on each side of said support retained against sliding movement with respect thereto, a plate on the outside of one of said springs and retained against movement with respect thereto, a tire having an inwardly radiating web adjacent the outside of the last named spring and retained against movement with respect thereto, and a plurality of bolts connecting said plate and web, said bolts having shoulders for engagement by opposed surfaces of said plate and web, nuts threaded thereon rigidifying the plate and web with respect to the shoulders, and spacers on said bolts between the tire carrying plate and the adjacent spring.

13. A wheel of the character described comprising a circular rim having an inwardly extending web, a hub having an outwardly extending web, cushion members interlocked with the hub web on opposite faces thereof and all located on one side of the rim web, whereby the entire opposite side of the latter is exposed to the air to facilitate dissipation of heat, means axially spacing the cushion members from said rim web whereby air may circulate between said rim web and cushion members to further facilitate dissipation of heat, and cantilevers extending laterally from the rim web piercing said cushion members and passing freely through openings in the hub web, and means coacting with said cantilevers for compressing the cushion members.

14. A wheel comprising a rim portion having an inwardly extending annular flange, circumferentially spaced projections on one side of said flange, a plate member adjacent said flange engaging said projections to form passages between said rim flange and said member, a second plate member spaced from said first named member, said members being detachably secured to said rim flange, a hub member having an annular flange extending between said members, and rubber means compressed between said hub flange and said members and acting in shear to support said hub member.

EMIL H. PIRON.